April 15, 1952  E. A. WEISS ET AL  2,592,773
CONTROL MEANS FOR POWER TRANSMISSION
Filed Feb. 13, 1946  3 Sheets-Sheet 1

INVENTORS
Erwin A. Weiss,
LeRoy H. Frakling &
Robert P. Clifton
BY
Sibbetts & Hart
Attorneys April 15, 1952  E. A. WEISS ET AL  2,592,773
CONTROL MEANS FOR POWER TRANSMISSION
Filed Feb. 13, 1946  3 Sheets-Sheet 2

Inventors
Erwin A. Weiss,
LeRoy H. Frauling &
Robert P. Clifton

By Sibbetts & Hart
Attorneys

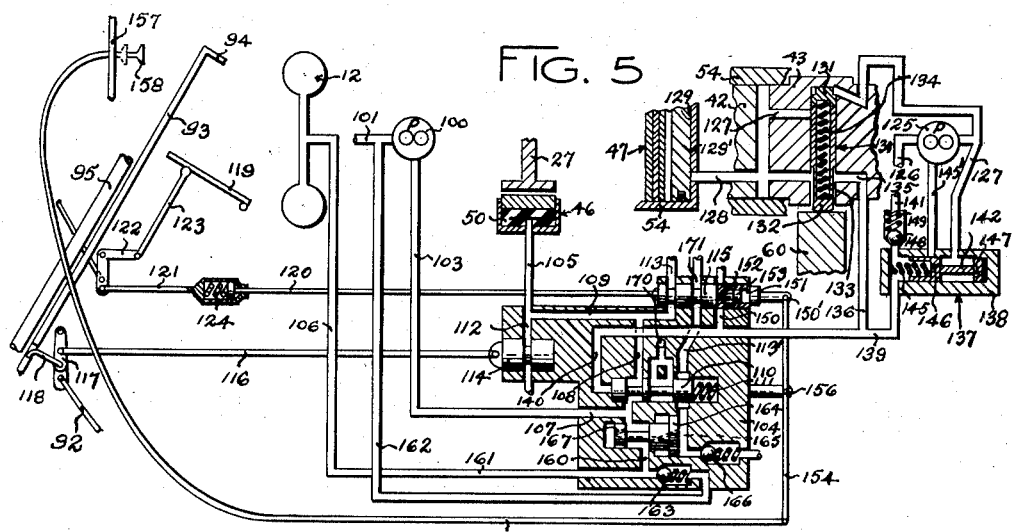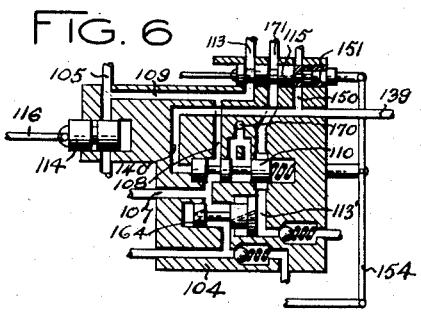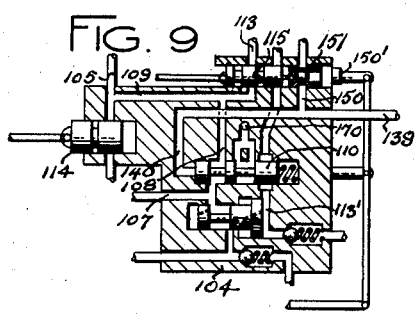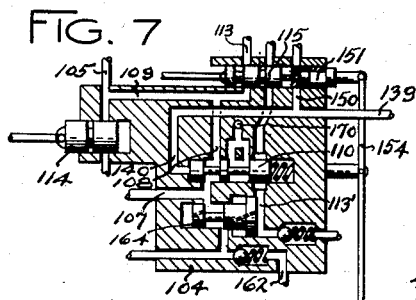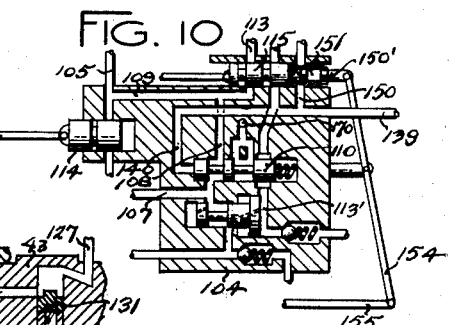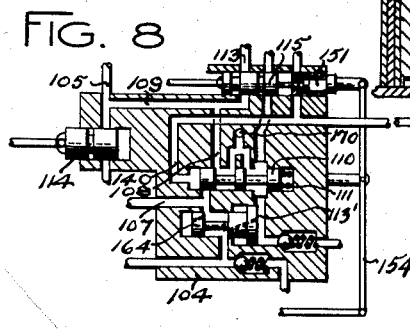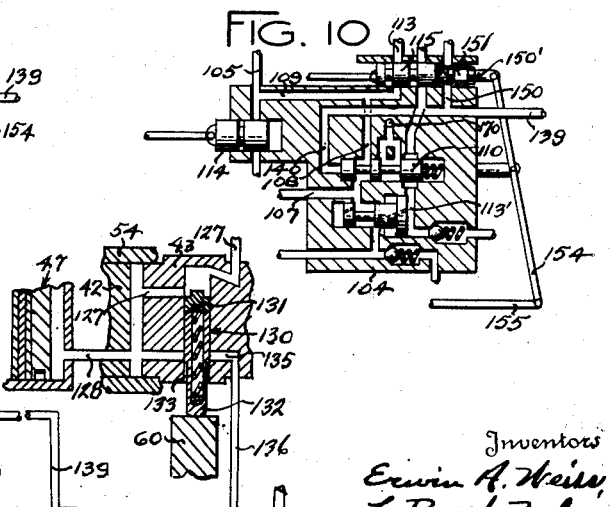

Patented Apr. 15, 1952

2,592,773

UNITED STATES PATENT OFFICE 2,592,773

CONTROL MEANS FOR POWER TRANSMISSION

Erwin A. Weiss and Le Roy H. Frailing, Detroit, and Robert P. Clifton, Dearborn, Mich., assignors to Packard Motor Car Company, Detroit, Mich., a corporation of Michigan Application February 13, 1946, Serial No. 647,332

17 Claims. (Cl. 74—645)

This invention relates to control means for power transmissions particularly adapted for use with motor vehicles.

An object of the invention is to provide an improved pressure fluid control means for a power transmission whereby different gear ratio drives may be readily effected without shifting gears.

Another object of the invention is to provide for establishing different gear ratio drives through a transmission by automatic pressure fluid operated control means that may be manually overruled.

Another object of the invention is to provide control means for a motor vehicle transmission having a plurality of different gear ratios in which the drive is finally established by depression of the accelerator pedal after being conditioned for forward or reverse drive.

Another object of the invention is to provide an improved form of torque-speed control for a hydraulic system utilized to effect different gear ratio drives in a transmission.

Another object of the invention is to provide a transmission for motor vehicles having gear ratios selectively made effective by alternate operation of two devices with control means in which two fluid pressure systems are interrelated and controlled automatically or by the vehicle driver.

Other objects of the invention will appear from the following description taken in connection with the drawings, which form a part of this specification, and in which:

Fig. 5 is a schematic view of the control means for the transmission in neutral;

Fig. 6 is a view similar to Fig. 5 with the control means set in forward neutral position;

Fig. 7 is a view similar to Fig. 5 with the control means set for first and second speed drive;

Fig. 8 is a view similar to Fig. 5 with the control means set for high speed drive;

Fig. 9 is a view similar to Fig. 5 with the control means set for kick down drive;

Fig. 10 is a view similar to Fig. 5 with the control means set for positive first or second speed drive.

Figure 1A:
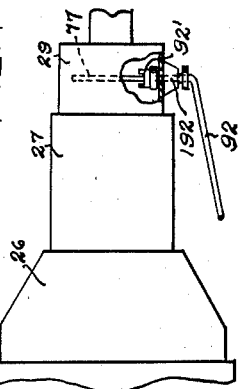
Fig. 1A is a plan view of a portion of the transmission showing some of the drive control mechanism.

Referring to the drawings by characters of reference, the power transmission mechanism comprises generally a power unit, such as an internal combustion engine of which the rear wall 10 and crankshaft 11 are illustrated, a fluid coupling 12 of the Fottinger type, planetary gearing 13 and clutch mechanism 14.

The coupling comprises an impeller 15, a primary rotor 16 and a secondary rotor 17. The impeller is fixed to the power input drive shaft 11 by bolts 18. Shaft 19 extends axially through the coupling members and is carried by bearing 20 in the hollow end of the crankshaft. Sleeve 21 is splined to shaft 19 within hub 22 of the primary rotor and a one-way clutch 23, of the coil spring type, is arranged between the sleeve and the hub. Sleeve shaft 24 telescopes shaft 20 and is fixed to the secondary rotor while sleeve 25 telescopes the sleeve shaft and is fixed to the impeller. The primary rotor and its attached sleeve will be referred to as the primary runner, while the secondary rotor and its attached shaft will be referred to as the secondary runner.

The fluid coupling 12, gearing 13 and clutch mechanism 14 are housed in a casing comprised of sections 26, 27, 28 and 29 suitably secured together. Casing section 26 housing the coupling is secured to the engine wall 10 by bolts 30 and has a rear transverse wall 31. Casing section 27 houses the gearing and has a transverse wall 32 intermediate its ends. Casing section 28 also has a transversely extending end wall 33.

The change speed gearing 13 is preferably of the planetary type providing a plurality of different gear ratios. The planetary gearing includes drive gears 34, 35, driven gear 36 and planet gears 37, 38 and 39. The planet gears are integral or fixed together as a stepped unit and there may be one or more of such units. Gear 37 meshes with drive gear 35 fixed on shaft 24, gear 38 meshes with drive gear 34 fixed on shaft 19 and gear 39 meshes with driven gear 36. The stepped gear unit is rotatably mounted on shaft 40 mounted on carrier 41. The carrier has a rear extension sleeve 41 extending through and supported by wall 32.

The power output means includes driven shaft 42 on which driven gear 36 is fixed, tail shaft 43 and propeller shaft 44 arranged axially in the order named. Shafts 42 and 43 are connected in drive relation by torque-speed device 45 and shafts 43 and 44 are adapted to be connected in forward or reverse drive relation by clutch mechanism 14.

Two devices 46 and 47 are associated with the planetary gearing carrier to condition the gearing for drive in any one of three gear ratios. Device 46 is a brake for holding the carrier 41 stationary and comprises a sectional band 48 adapted to be applied to drum 49 fixed to the carrier by bolts 50'. The band is normally disengaged and is applied to the drum by a rubber tube 50 anchored to casing section 27, the tube being connected with a pressure fluid system described hereafter. When the brake device is applied to hold the carrier stationary, torque will be multiplied through the low speed gears 34 and 38 or the intermediate speed gears 35 and 37 as dictated by the effectiveness of the fluid coupling runners. The primary runner will be effective to drive during low speed operation of the fluid coupling and the secondary runner will take over the drive above some coupling speed, the clutch 23 permitting overrun of the primary runner. Thus either low or intermediate gear ratio will be automatically established when the brake device is applied to the carrier.

The clutch device 47 may be engaged to lock the planetary gearing together so that it will rotate as a unitary structure and thereby establish high speed drive. Clutch hub 52 is splined to carrier extension sleeve 41 and a clutch rim 53 is fixed by bolts 58 to housing 54 splined on the driven shaft 42. Clutch plates 57 are alternately engaged with hub 52 and rim 53 and are engaged by pressure plate 55 that is normally moved to disengaging position by springs 56. The clutch device is engaged for high speed drive by a pressure fluid system described hereafter.

Figure 4:
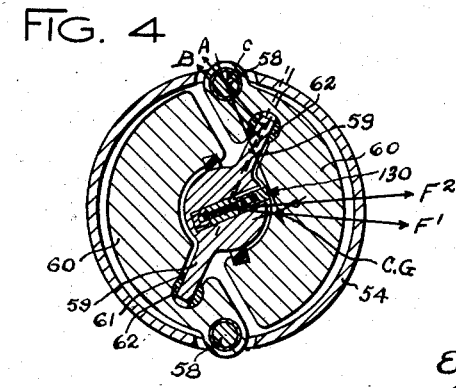
Fig. 4 is a sectional view taken on line 4—4 of Fig. 1 showing the torque-speed driving and control device associated with the control system for the clutch device.

The torque-speed device 45 drivingly connects housing 54 with arms 59 extending radially from the forward end of the tail shaft 43. This device, see Fig. 4, comprises a pair of weight members 60 pivotally mounted on bolts 58 and slidably mounted on arms 59. The weight members are formed with slots 61 in which are bearings 62 through which the arms may slide. These bearings are rotatably mounted so they will accommodate the arms as the weights swing under centrifugal force on their pivots. It will be noted that the arm bearings 61 are offset from the pivotal connections 58 which arrangement has a part in controlling the shift between high speed and intermediate speed and will be further described hereafter.

Clutch mechanism 14 is arranged to disconnect drive between shafts 43 and 44 for neutral, or to connect shaft 43 with shaft 44 for forward drive or reverse drive. Shaft 43 has gear 64 splined on its rear end and an annulus gear 65 is fixed to the forward end of shaft 44 concentric with gear 64. Reverse idler gear 66 meshes with gears 64 and 65 and is rotatably mounted on pin 67 fixed to the rear end of shiftable clutch sleeve 68. Gear 64 has a forwardly extending sleeve 69 on which the clutch sleeve 68 is mounted and another clutch sleeve 70 telescopes sleeve 68. The sleeve 70 is slidably splined on the sleeve 68 and has teeth 71 arranged to engage teeth 72 on ring 73 fixed to casing wall 33. Sleeve 68 has internal teeth 74 adapted to engage gear 64 and external teeth 75 adapted to engage gear 65 on the enlarged end 76 of shaft 44. Sleeve 70 has a radially extending actuator flange 77 formed with openings 78 through which pins 79 of smaller diameter extend and synchronizer brake discs 80 and 81 are fixed to the ends of the pins. The synchronizer pins are formed with interior and exterior recesses 82, the interior recesses receiving upstanding bowed portions of leaf springs 83. These springs are seated in recesses 84 in sleeve 70 and are fixed to move therewith. The sleeve 68 has a radial opening 85 aligning with a recess 86 in sleeve 69 for the reception of balls 87 and sleeve 70 has an axially extending groove 88 into which the upper ball may be moved.

Figure 1:
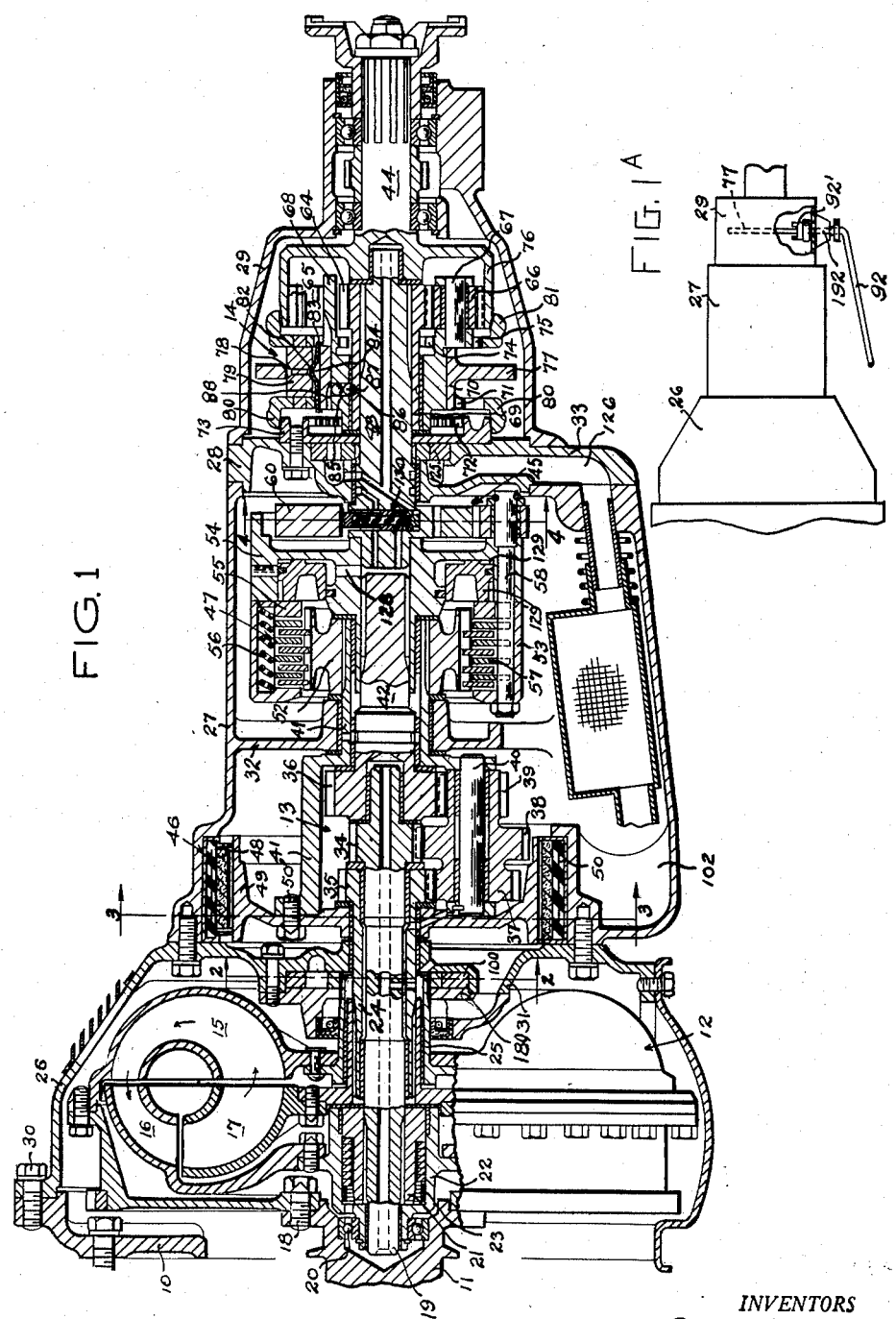
Fig. 1 is a longitudinal sectional view of a transmission mechanism incorporating the invention.

The clutch mechanism just referred to is shown in neutral position in Fig. 1. Reverse drive is obtained when actuator 77 and sleeve 70 are shifted to the left engaging teeth 71 with teeth 72, and forward drive is obtained when clutch sleeve 70 is shifted to the right engaging teeth 74 with gear 64 and teeth 75 with gear 65. When shifting from neutral to reverse drive, the sleeve 70 is moved toward the left and spring 83 will move pins 79 thereby causing brake disc 80 to frictionally engage ring 73 before teeth 71 engage teeth 72. Torque will shift the pins rotationally so that the wall of flange 77 at the openings 78 will project into the exterior recesses 82 on the pins blocking further movement of sleeve 70 until it has been brought to a stop. The operator can then overrule springs 83 and continue movement of the sleeve to engage the teeth 71 and 72. As sleeve 70 is splined to sleeve 68, the pins 67 will be held stationary so that the drive will pass from gear 64 through reverse gear 66 to gear 65 providing reverse drive from shaft 43 to shaft 44. During such shift, sleeve 68 cannot move to the left as it bears against a solid abutment at its forward end.

Forward drive may be established by shifting actuator 77 and sleeve 70 to the right, as viewed in Fig. 1. Such movement of the actuator will carry the springs 83 therewith which in turn move synchronizer disc 81 into frictional engagement with the enlarged end 76 of the propeller shaft 44. The direct drive clutch teeth are not yet engaged and torque will now cause exterior recesses 82 to block further shifting of pins 79 and sleeve 70 until the sleeve and shaft 44 are rotating at the same speed. Flange 77 can then be shifted further, as the pins can be moved through exterior pin recesses 82, to engage teeth 74 and 75 with gears 64 and 65 whereupon shafts 43 and 44 will rotate in unison.

The clutch mechanism is shifted by cable 92 connecting one arm of shaft 192 with lever 117 pivotally connected by arm 118 with shifter column 93 terminating in a handle or arm 94 located adjacent the steering column 95 within convenient reach for operation by the vehicle driver. The other arm of shaft 192 is fixed to fork 92' straddling flange 77 of shifter sleeve 70.

Brake and clutch devices 46 and 47 are actuated by pressure fluid means comprising two separate fluid systems associated so that one will control the other under certain vehicle operating conditions.

The fluid system for controlling the brake device, see Fig. 5, includes pump 100 having an inlet conduit means 101 leading from the sump 102 of casing section 27, an outlet conduit means 103 leading to a fluid flow control device housing 104 and fluid delivery conduit means 105 leading from the housing to the interior of brake tube 50. This control device housing is also connected with the interior of the fluid coupling 12 by conduit means 106. Fluid entering the housing flows to conduit means 105 through passages 107, 103 and 109 and a flow control valve 110 extends across passage 108. This control valve is acted against by spring 111 to normally maintain a reduced diameter portion thereof in registration with passage 108, thereby permitting fluid flow from passage 107 to passage 109.

Vent passages 112 and 113 connect with passage 109 and fluid flow therethrough is controlled by valves 114 and 115. Valve 114 is preferably controlled by the shift linkage for clutch mechanism 14 and is connected therewith by rod 116, link 117 and arm 118. Valve 115 is preferably actuated by the engine accelerator pedal 119 through linkage comprising rods 120, 121, bell crank 122 and rod 123. Rods 120 and 121 have a lost motion interconnection and are normally moved to extended relation by spring 124. When valve 110 opens passage 108, both vent valves 114 and 115 must be closed for pressure fluid to expand tube 50 and apply the brake on the planetary gearing carrier 41. The arrangement is such that valve 115 will open vent passage 113 whenever the accelerator pedal is in idling position and will be closed when the accelerator pedal is pushed down beyond engine idling position. The arrangement is such that valve 114 will open vent passage 112 when the clutch mechanism 14 is in neutral position and will close the passage when the clutch mechanism is shifted into forward or reverse drive positions.

It will be seen that valve 110 will normally allow pressure fluid to engage the brake device whenever the engine is operating but the fluid system will be vented unless forward drive or reverse drive is established and the accelerator pedal is depressed. Thus the engine can be running and clutch mechanism 14 engaged for forward or reverse drive without the drive through the gearing being effective, see Fig. 6, but as soon as the accelerator pedal is depressed the brake device will be applied to the carrier and the drive will be made effective, see Fig. 7. This arrangement allows the transmission to be conditioned for driving when standing still, at a stop light for example, without creeping even though there is fluid drag from the coupling to the gearing because the accelerator pedal must be depressed from idling position to apply the brake device before free rotation of the carrier is entirely stopped.

The fluid system for controlling the clutch device, see Fig. 5, includes pump 125 having fluid inlet conduit means 126 leading from sump 102 and pressure fluid outlet conduit means 127 (Figs. 5 and 8). Conduit means 127 extends through the forward end of tail shaft 43 and opens to the space between 42 and 43, such space being open to passage 128 in housing 54 leading to chamber 129 housing piston 129' for actuating clutch pressure member 55 to engage clutch plate 57. A valve device 130 is arranged in the tail shaft to control fluid flow to the clutch device 47 and to vent the system. This valve device is in the form of a hollow cylinder composed of sections 131 and 132, slidably mounted in radially extending tail shaft recess 133 traversed by passage 127. Spring 134 in the cylinder normally acts to hold valve section 132 projecting outside of the tail shaft against one of the torque-speed controlled flyweights 60. When the flyweight is in an inner range of its pivotal movement, the valve device 130 will be held to shut off conduit means 127. Venting of this system is also controlled by valve device 130 as it also traverses conduit means 135 in shaft 43 that communicates with passage 128 and conduit means 136 leading to a valve device 137. The inner end of valve section 132 is of reduced diameter to allow fluid to vent through recess 133 when the flyweights are in their innermost range of their movement. As the flyweights move outwardly spring 134 will cause the valve section 132 to follow so that the larger diameter portion of the valve section will close off venting through the recess 133 and fluid pressure will build up moving valve section 131 to allow pressure fluid flow through passage means 128 to engage clutch device 47.

The valve device 137 has a casing 138 with which conduit means 127 is in communication. Conduit means 139 is connected with the interior of casing 138, vent conduit 136, passage 140 in control device housing 104 and vent conduit 141. Passage 140 opens to one end of valve 110 in the brake control device housing so that pressure fluid in the clutch control system is utilized to automatically actuate valve 110 to shut off the brake fluid system when the clutch system becomes effective. Valve 142 in housing 138 has a head at each end and spring 145 in the housing acts to normally maintain the valve so that the head covers conduit means 145' leading from the valve housing to the inlet side of pump 125. One head of the valve has passage 146 therethrough, the other head has a passage 147 therethrough. Passage 147 allows fluid to collect in the adjacent end of the valve housing to provide a dash pot effect so that valve will not flutter. Passage 146 provides a connection between conduit means 127 and conduit means 139. Vent conduit 141 contains a check valve 148. When pump 125 is operating pressure fluid flows into conduit means 127 to valve housing 138, through passage 146 to conduit means 139, conduit means 136 and is vented through recess 133 when valve device 130 permits. As valve member 132 follows weight 60 outwardly it shuts off flow through the vent end of passage 133 and pressure in conduit means 127 will move valve section 131 inwardly allowing flow to the clutch device 47. When such venting ceases, pressure will build up in conduit 139 and passage 140 moving valve 110 to shut off fluid flow to brake device 46 thereby releasing the carrier. Spring 149 acting against check valve 148 maintains a predetermined maximum pressure in conduit 139. Where pressure in the valve casing 138 becomes greater than the resistance of spring 145 and maximum oil pressure in conduit 139, valve 142 will be moved to open the passage 127 to bypass conduit 145, thus venting sufficient fluid to maintain a predetermined maximum pressure in conduit means 127.

The flyweights 60 are mounted so that torque exerts a force to move them inwardly while centrifugal force acts to move them outwardly when sufficient to overcome torque force. By selection of the relation of the pivot centers for the weights and the selection of the mass of the weights the operation of the valve device 130 may be predetermined as desired, see Fig. 4. CG represents the center of gravity of one of the weights 60. In shifting up from second speed to high speed, centrifugal force F' overcomes force B and the weights fly out. In shifting down from high speed to second speed, force A overcomes centrifugal force F2 and the weights are forced in. If both shifts occur at full motor torque the down shift will occur at a much lower speed than the up shift because the following conditions prevail. Force A is less than force B due to the change of pivot centers A and B and also to the smaller torque in high gear. Since force A is less than force B and acts nearer to center C about which the flyweight rotates, it will take less centrifugal force to overcome force A. An equal R. P. M. force F2 will be greater than force F1 because the flyweight center of gravity will be farther from the flyweight center of rotation. This offset arrangement of the pivot centers serves to provide for shifting up at a higher speed than when shifting down.

Conduit means 139 in which pressure fluid is maintained when the clutch device 47 is engaged to shut off fluid flow to brake device 46, may be also vented through passage 150 in housing 104. Flow through vent passage 150 is controlled by valve 151 preferably compounded with valve 115. This valve 151 is hollow and has a head end through which stem 152 extends and head 153 on the end of the stem may engage this head end of valve 151 to remove it with valve 115 when the accelerator pedal is depressed beyond wide open throttle position. Valve 151 may also be normally operated through actuator means 150' engaging its end and reciprocated by lever 154 and cable 155. The lever is rockable on pivot 156 fixed to a stationary part of the vehicle and the cable attached to the rod extends to the vehicle dash 157 where it terminates in knob 158.

The driver pushes in the knob for shifting valve 151 to vent conduit means 139 keeping the brake device 46 applied even when operating conditions dictate that the clutch device 47 engage, such driving relation being termed geared drive. If the vehicle is in high speed drive, a lower speed drive may be obtained by depressing the accelerator pedal beyond wide open throttle position which will move valve 151 through means of valve 115 to vent conduit means 139, such driving relation being termed kick down. This kick down drive will be maintained only so long as the accelerator pedal dictates.

The fluid intake conduit 107 in casing 104 is connected with passage 160 and conduit means 161 leads therefrom to the coupling 12. Conduit 162 connects passage 160 with the fluid intake conduit means 101 for pump 100 and venting of fluid to conduit 162 is controlled by check valve 163 to thus regulate the pressure of fluid flowing to coupling 12.

Fluid pressure in passage 108 is controlled by a balanced pressure valve 164 in casing 104. The end of the valve has a passage 165 therethrough communicating with chamber 113' and the chamber 113' has an outlet controlled by check valve 166. The other end of the balanced pressure valve has a passage 167 through which oil may flow to provide a dash pot effect so that the valve will not flutter. Valve 164 acts to maintain a predetermined fluid pressure in the system leading to brake device 46 as it moves axially to increase or decrease the flow through passage 160 and is shifted by fluid pressure condition in chamber 113'. Valve 115 also controls venting of chamber 113' and is arranged to open and close vent passage 171.

When valve 110 is shifted by pressure fluid in passage 140, passage 108 and chamber 113' will be open to vent passage 170 in housing 104 thus releasing brake device 46 at the time clutch device 47 is engaged.

Figure 3:
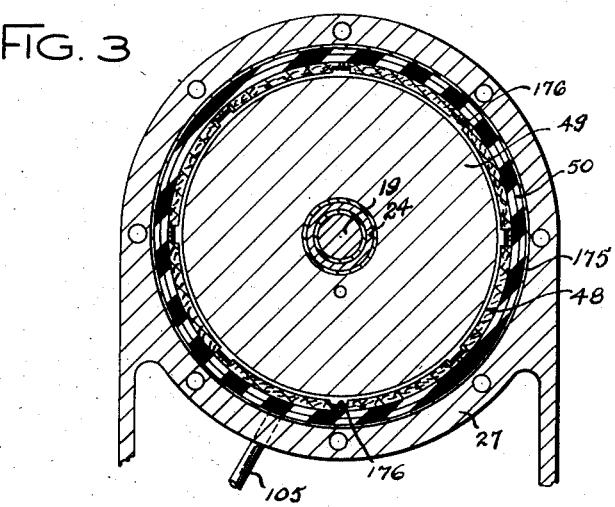
Fig. 3 is a sectional view taken on line 3—3 of Fig. 1 showing the carrier brake device.

Brake device 46, see Fig. 3, includes housing 175 suitably fixed to casing section 27, the rubber tube 50 fixed to housing 175, the sectional brake band 48 and leaf spring member 176 between the ends of the sections of the brake band normally functioning to be self-releasing from carrier rim 49.

Figure 2:
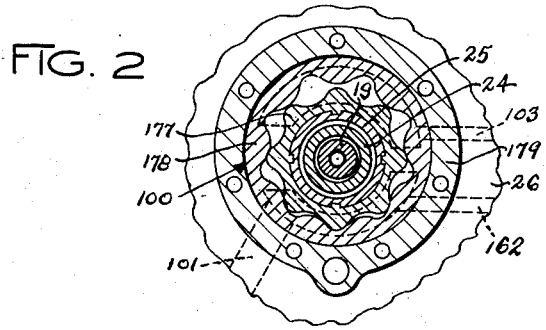
Fig. 2 is a sectional view taken on line 2—2 of Fig. 1 showing the forward pump in the hydraulic control system.

Pumps 100 and 125 are similar in construction but of different capacity. The forward pump details are illustrated in Fig. 2 wherein the two meshing gear members of the pump are indicated by numerals 177 and 178. Pump member 177 is fixed to sleeve 25 on the coupling impeller so that it will be rotated in unison with the engine crankshaft 11. This pump is housed in a chamber formed by transverse wall 31 of casing section 26 and cover plate 180 secured to such wall. Pump 125 is housed in wall 33 and is driven by the tail shaft 43.

Pump 100 in the fluid control system for the brake device is larger than pump 125 and will be operating whenever the engine is running while pump 125, in the fluid control system for the clutch device, will operate only when tail shaft 43 is rotating. The fluid in the control systems may be lubricating oil and both pumps are supplied from the sump 102 into which oil drains from the gearing, the fluid coupling and the vents in the control systems.

The clutch device 47 will be engaged only when the tail shaft speed is such that centrifugal force will move flyweights outwardly against the opposed torque force sufficiently for valve device 130 to shut off venting through recess 133. Thus in starting up and until the vehicle operation reaches some predetermined condition, the clutch device cannot be engaged. The brake device control system is vented by valve devices 114 and 115 when the clutch mechanism 14 is in neutral and when the accelerator pedal is in idling position. Thus in neutral, with the engine running, the brake device will not be effective as the system will be vented through passage 112 and chamber 113' in the control device housing 104, see Fig. 5.

When shifting the clutch mechanism 14 into either forward or reverse, valve 114 will be shifted to close vent passage 112 but with the accelerator pedal in engine idling position, valve 115 will still vent the system so that the brake device will not be applied to the planetary gearing carrier and the gearing will rotate freely. This control position is illustrated in Fig. 6 and is known as forward or reverse neutral.

With the clutch mechanism conditioned for forward or reverse drive, as shown in Fig. 6, it is only necessary for the driver to depress the accelerator pedal in order to cause application of the brake device for establishing drive through the gearing, see Fig. 7. Vent valves 114 and 115 will now be closed so that pressure fluid will flow from pump 100, conduit means 103, passages 107, 108 and 109 and conduit means 105 to the interior of tube 50. Inflation of the tube will contract brake band 48 to engage carrier drum 49 and prevent its rotation. Vent chamber 113' will also now be closed by valve 115 so fluid flowing through passage 165 in valve 164 will be trapped in the chamber and the valve 164 will be balanced to maintain a predetermined pressure in the system leading to the brake. Shifting of valve 164 allows more or less venting of the system back to pump 100 through conduit means 162 as required to maintain a predetermined fluid pressure. Excessive pressure in chamber 113' is relieved by valve 166, and in passage 160 by valve 163. Valve 110 is held by spring 111 in one position to permit fluid flow between passages 107 and 108 and is moved by pressure in passage 140 to another position opening passage 108 and chamber 113' to vent passage 170.

With the brake device 46 applied to the carrier, the geared drive may be through either of the gear trains to gear 36. When the primary rotor 16 of the fluid coupling is effective low speed drive or maximum torque multiplication will result, and when the secondary rotor 17 is effective, as the driver, intermediate speed or reduced torque multiplication will result. The effectiveness of the runners is automatic and dependent on the fluid force developed in the coupling.

High speed drive will be automatically established when the control systems are in the positions shown in Fig. 8 caused by the torque-speed driving device 45 shifting valve device 130 so that the clutch device control system is no longer vented, to thus engage the clutch device 47. When this occurs pressure build up in conduit means 139 will shift valve 110 to cut off fluid flow between passages 107 and 108 and opening passage 108 and chamber 113' to vent 170. The brake device 46 will now be disengaged and clutch device 47 engaged. The planetary gearing will now rotate as a unit so the drive from the impeller to the tail shaft will be direct except for some fluid slip in the coupling. Obviously when the torque-speed controlled valve 130 vents the clutch control system, the clutch device will disengage and valve 110 will move back to resume effective functioning of the fluid control system for the brake device.

When the gearing is in direct or high speed drive with the control mechanism in the relation shown in Fig. 8, shift to kick down may be obtained by depressing the accelerator pedal beyond wide open throttle position, see Fig. 9. The overtravel of the accelerator pedal will move linkage 121, 120 forwardly moving valve 115 and valve 151 forwardly to uncover vent passage 150. The fluid pressure in passage 140 will now be relieved allowing spring 111 to shift valve 110 back to normal position, so that fluid will flow from passage 107 to 108 and cause the brake device 46 to engage the carrier while at the same time the clutch device 47 will disengage as its control system is vented. This drive condition will exist while the accelerator pedal is held in overtravel position. Direct or high speed drive will be reestablished by allowing the accelerator pedal to return to less than wide open throttle position.

Geared or positive drive may be established and maintained with the control systems in the relation shown in Fig. 10. By pushing in knob 158 cable 155 is moved rearwardly to rock lever 154 in a direction moving valve 151 forwardly to vent the fluid system for the clutch device through passages 140 and 150. The clutch device 47 is now released regardless of the action of the torque-speed controlled valve 130 because the system is vented. When the clutch device system is vented valve 110 assumes the position for braking the carrier so the drive is through either set of gear trains as dictated by the pressure condition in the fluid coupling. This geared drive will be maintained until the knob 158 is pulled out to shift valve 151 so that vent passage 150 is closed, whereupon the other controls will again function in the normal manner.

Any of the various controls described may be utilized when the clutch mechanism 14 is shifted for either forward or reverse drive.

It will be understood that various forms of the invention other than those described above may be used without departing from the spirit or scope of the invention.

What is claimed is:

1. In control means for gearing in a vehicle transmission, a brake device for establishing one gear ratio drive through the gearing, a clutch device for establishing another gear ratio drive through the gearing, separate pressure fluid systems for actuating the devices, automatic means for controlling fluid flow in the system for actuating the clutch device, a normally open flow control valve in the system for actuating the brake device, means connecting the clutch device fluid control system with the valve in the brake actuating system to close the same when the clutch device actuating system is effective, normally closed vent valve means for the clutch actuating system, and driver operable means for opening the vent valve means at will.

2. In control means for gearing in a vehicle transmission, a brake device for establishing one gear ratio drive through the gearing, a clutch device for establishing another gear ratio drive through the gearing, separate pressure fluid systems for actuating the devices, automatic means for controlling fluid flow in the system for actuating the clutch device, a normally open flow control valve in the system for actuating the brake device, means providing a connection from the clutch device actuating system to close the brake fluid control valve when said system is effective to engage the clutch, vent valve means for the clutch device control system operable to vent the system at will, and means extending to the dash and operable by the vehicle driver for opening said vent valve means.

3. In control means for gearing in a vehicle transmission powered by an engine controlled by an accelerator pedal adapted to overtravel a position corresponding to wide-open engine throttle position, a two-way brake device for establishing one gear ratio drive through the transmission, a clutch device for establishing another gear ratio drive through the transmission, separate pressure fluid systems for actuating the devices, means for controlling fluid flow to the clutch device, a normally open valve in the fluid system for operating the brake device, means connecting the fluid system for the clutch device to shift the brake device system control valve to closed position, a vent valve for the connecting means, and a connection between the vent valve and the accelerator pedal whereby the vent valve will be shifted to vent the connecting means upon overtravel of the accelerator pedal.

4. In control means for a vehicle change speed gearing powered by an engine controlled by an accelerator pedal adapted to overtravel a position corresponding to wide-open engine throttle position, a brake device for establishing torque multiplication through the gearing, a clutch device for establishing substantially direct drive through the gearing, separate pressure fluid systems for actuating said devices, valve means operated automatically for controlling fluid flow in the system for actuating the clutch device, a normally open valve in the fluid system for actuating the brake device conduit means through which pressure fluid in the clutch device actuator can flow to close said valve in the brake device actuator system, a vent for the conduit means, a valve for the vent, means operable by overtravel of the accelerator pedal for shifting said valve to open the vent, and a driver operated means for shifting said valve to open the vent.

5. In control means for a vehicle change speed gearing powered by an engine controlled by an accelerator pedal, a brake device for establishing torque multiplication through the gearing, a clutch device for establishing substantially direct drive through the gearing, separate pressure fluid systems for actuating said devices, valve means for automatically controlling fluid flow in the system for actuating the clutch device, a normally open valve in the system for actuating the brake device, a conduit means connecting the system for actuating the clutch device to close the valve in the brake device control system, a vent for said conduit means, a valve member controlling the vent, means operable at will for shifting the valve member, a valve member operable by the accelerator pedal controlling flow through the brake device control system to vent said system only while the accelerator pedal is in engine idling position, and means connecting said accelerator actuated valve with said vent valve to shift the latter valve into venting position while the accelerator pedal is moved beyond wide open throttle position.

6. In control means for a vehicle change speed gearing powered by an engine controlled by an accelerator pedal, a brake device for establishing torque multiplication through the gearing, a clutch device for establishing substantially direct drive through the gearing, separate pressure fluid systems for applying said devices, valve means operated automatically for controlling fluid flow in the system for actuating the clutch device, a normally open valve in the fluid system for actuating the brake device, conduit means through which pressure fluid in the clutch device control system can flow to force said valve in the brake device control system to closed position, a vent for the conduit means, a vent in the pressure fluid system for the brake device between the valve therein and the device, compound valve means for controlling said vents having two members having a lost motion connection, one of the valve members being connected for actuation by the accelerator pedal and controlling the brake device system vent, the other valve member controlling the conduit means vent and being operable by the vehicle driver at will or through movement with the accelerator pedal operated member when said pedal is in overtravel position, the first mentioned valve member being positioned to open the vent in the brake device system only when in engine idling position.

7. In a control means for a transmission adapted to be conditioned for driving at either one of two speeds by two devices, two separate pressure fluid systems for operating said devices, a normally open valve controlling fluid flow in one system, means connecting the other fluid system to close said valve when said second system is conditioned to operate its associated device, and means controlling fluid flow in said other fluid system as a function of the torque transmitted by the transmission to determine which of the two speeds shall be operative.

8. In a control means for a transmission adapted to be conditioned by two devices for driving at either one of two speeds, a pressure fluid system for controlling each device, a normally open valve in one system, fluid pressure responsive means connected to the normally open valve and adapted to operate to close the said valve, a torque-speed controlled valve in the other system controlling flow to the associated device, and conduit means connecting the torque-speed valve controlled system with the pressure responsive means connected to the normally open valve whereby fluid pressure will shift said valve to closed position.

9. In a control means for a transmission adapted to be conditioned by a brake device and a clutch device for driving at either one of two gear ratios, a pressure fluid system for controlling the brake device, a pressure fluid system for controlling the clutch device, vent means for controlling fluid flow in the clutch device control system, a control device in the brake control system including passage means traversed by a normally spring opened valve, and passage means in the control device connected with the clutch device control system and with said spring opened valve to conduct fluid under pressure to the valve in opposition to the spring to close the same when the clutch device control system is effective.

10. In a control means for planetary gearing in vehicle power transmission, a brake device for engaging one element of the planetary gearing to effect torque multiplication, a clutch device for locking the planetary gearing to rotate as a unit, a pressure system for controlling the brake, a pressure system for controlling the clutch, a normally open valve in the brake controlling system, a connection between the clutch controlling system and said valve whereby fluid pressure in the clutch controlling system will close said valve, and a vent valve in the clutch controlling system controlled by the operator to release the clutch.

11. In a variable speed ratio power transmission control means of the character described having a pressure fluid operated device for controlling drive between driving and driven shafts of a motor vehicle transmission, a pressure system for delivering fluid under pressure to the device, a normally open valve in the system, a second pressure fluid system controlling said valve, and means for controlling fluid flow in said second system in accordance with speed and torque conditions in the driven shaft to condition the transmission for optimum ratio drive.

12. In a control means for planetary gearing in a vehicle power transmission, brake and clutch devices alternately operable for effecting two driving ratios, pressure means for delivering fluid under pressure to control said devices, a normally open valve in the pressure means controlling the brake device, a valve in the pressure means for controlling the clutch device and a torque-speed responsive means driven by the transmission and controlling said last mentioned valve.

13. Control means for conditioning a transmission for driving a shaft in either one of two gear ratios comprising a brake device, a clutch device, independent pressure fluid systems for controlling said devices, a normally open valve in the brake device controlling system, a normally open vent valve in the clutch device control system, said vent valve closing in response to the speed of rotation of said shaft, a balanced pressure valve in the fluid system controlling pressure in the brake device fluid system, and a connection from the clutch device control system to the balanced pressure valve whereby fluid in the connection will act against and close the normally open valve when the speed control vent valve is closed.

14. In control means for selecting two driving gear ratios through a transmission, a brake device, a clutch device, said devices conditioning the transmission for a selective gear ratio drive, independent pressure fluid systems for actuating the devices, a normally open vent means in the clutch device controlling system, said vent means closing in response to torque and speed conditions in the transmission, and a control means in the brake device fluid system comprising a normally open valve closed by the pressure in the other system and a balanced pressure valve controlling pressure in the brake device fluid system.

15. In control means for conditioning a transmission for driving, a brake device, a pressure fluid system for controlling said device, a flow control housing for the system having connected flow passages and a pressure chamber, a normally open valve traversing the flow passage, means for moving said valve to shut off fluid flow to the brake device and to vent the pressure chamber, a balanced pressure valve in the passage leading to the shut off valve, and a passage through the balanced valve connecting the adjacent fluid passage with the pressure chamber.

16. In a vehicle transmission, change speed gearing for connecting power input means with an output shaft, a clutch device operable to condition the gearing for one speed ratio drive, a pressure fluid system for actuating said clutch, a fluid flow control valve in the system, a tail shaft, and torque-speed responsive means including weights and offset pivot means connecting the peripheral portion of the weights with the tail shaft, one of said weights actuating said valve.

17. In a vehicle transmission, planetary change speed gearing for driving a power output shaft in different gear ratios, a clutch device engageable with the gearing to condition it for rotation as a unit, a pressure fluid system including a passage in said shaft leading to the clutch device, a flow control valve in the passage in said shaft, a tail shaft, weights carried by the output shaft and pivoted therein adjacent their periphery, one of said weights actuating said valve, pivot means rotatably mounted on said weights adjacent the periphery of the weights and offset from the pivotal connections with the output shaft, and arms on the tail shaft slidably mounted in said rotatably mounted pivot means.

ERWIN A. WEISS.
LE ROY H. FRAILING.
ROBERT P. CLIFTON.

REFERENCES CITED

The following references are of record in the file of this patent:

UNITED STATES PATENTS

| Number | Name | Date |
|---|---|---|
| 1,607,986 | Jones et al. | Nov. 23, 1926 |
| 1,609,782 | Small | Dec. 7, 1926 |
| 2,319,388 | Cotterman | May 18, 1943 |
| 2,332,593 | Nutt et al. | Oct. 26, 1943 |
| 2,343,955 | Cotterman | Mar. 14, 1944 |
| 2,372,817 | Dodge | Apr. 3, 1945 |